(12) United States Patent
Cambron

(10) Patent No.: US 6,984,045 B2
(45) Date of Patent: *Jan. 10, 2006

(54) SYSTEM AND METHOD FOR DISPLAYING PROJECTOR SYSTEM IDENTIFICATION INFORMATION

(75) Inventor: Michael J. Cambron, Batesville, IN (US)

(73) Assignee: InFocus Corporation, Wilsonville, OR (US)

( * ) Notice: Subject to any disclaimer, the term of this patent is extended or adjusted under 35 U.S.C. 154(b) by 52 days.

This patent is subject to a terminal disclaimer.

(21) Appl. No.: 10/916,060

(22) Filed: Aug. 10, 2004

(65) Prior Publication Data

US 2005/0012911 A1 Jan. 20, 2005

Related U.S. Application Data

(63) Continuation of application No. 10/421,526, filed on Apr. 12, 2003, now Pat. No. 6,783,252.

(51) Int. Cl.
G03B 21/14 (2006.01)

(52) U.S. Cl. .......................... 353/122; 353/30
(58) Field of Classification Search ................ 353/28, 353/30, 122; 348/589
See application file for complete search history.

(56) References Cited

U.S. PATENT DOCUMENTS

| 5,428,417 | A | 6/1995 | Lichtenstein |
| 5,570,944 | A | 11/1996 | Seder et al. |
| 5,648,789 | A | 7/1997 | Beadles et al. |
| 6,559,813 | B1 | 5/2003 | DeLuca et al. |
| 6,663,244 | B1 | 12/2003 | Wichner et al. |
| 6,712,476 | B1 | 3/2004 | Ito et al. |

Primary Examiner—William C. Dowling
(74) Attorney, Agent, or Firm—Alleman Hall McCoy Russell & Tuttle LLP

(57) ABSTRACT

A system and method of displaying identification information for a projector system are disclosed. The method includes projecting a display onto a viewing surface with the projector system, and projecting an identification image onto the viewing surface over at least a part of the display with the projection system, wherein the identification image is configured to convey the identification information to a viewer.

29 Claims, 4 Drawing Sheets

SYSTEM AND METHOD FOR DISPLAYING PROJECTOR SYSTEM IDENTIFICATION INFORMATION

CROSS-REFERENCE TO RELATED APPLICATIONS

This application is a continuation of and claims priority to U.S. patent application Ser. No. 10/421,526, filed on Apr. 21, 2003, entitled "System and Method for Displaying Projector System Identification Information", now U.S. Pat. No. 6,783,252.

TECHNICAL FIELD

The present invention relates to a projector system configured to display information related to the identification of the projector system along with the display of other information.

BACKGROUND

In recent years, projector systems, such as digital projectors, have found increased popularity as a tool for the presentation of content to an audience. These projector systems are typically used to project a computer-generated presentation onto a viewing surface, and allow a user to easily present high-quality, professional appearing images to audiences of a range of sizes. As a result, these projector systems are now often found as permanent fixtures in conference rooms and other meeting facilities.

A typical projector system may be used to project images from many different types of sources. Examples of possible image sources include still image sources such as presentation slide files, as well as analog or digital video signals from sources such as cable or satellite video installations, DVD players, videocassette players, etc.

The wide range of possible uses, combined with the small size of many projector systems, may make these devices popular targets for thieves. To help protect a projector system from theft, the owner of the device may affix some sort of identification indicia, such as a plate or tag with information regarding the owner, to the projector system. However, such indicia may be easy for a thief to remove from the projector system, and thus may be ineffective at deterring theft. Furthermore, such indicia may be ineffective at communicating information regarding the owner or identity of the projector system to a large audience.

SUMMARY

A system and method of displaying identification information for a projector system are provided. The method includes projecting a display onto a viewing surface with the projector system, and projecting an identification image onto the viewing surface over at least a part of the display with the projection system, wherein the identification image is configured to convey the identification information to a viewer.

DETAILED DESCRIPTION OF THE DEPICTED EMBODIMENTS

Figure 1:
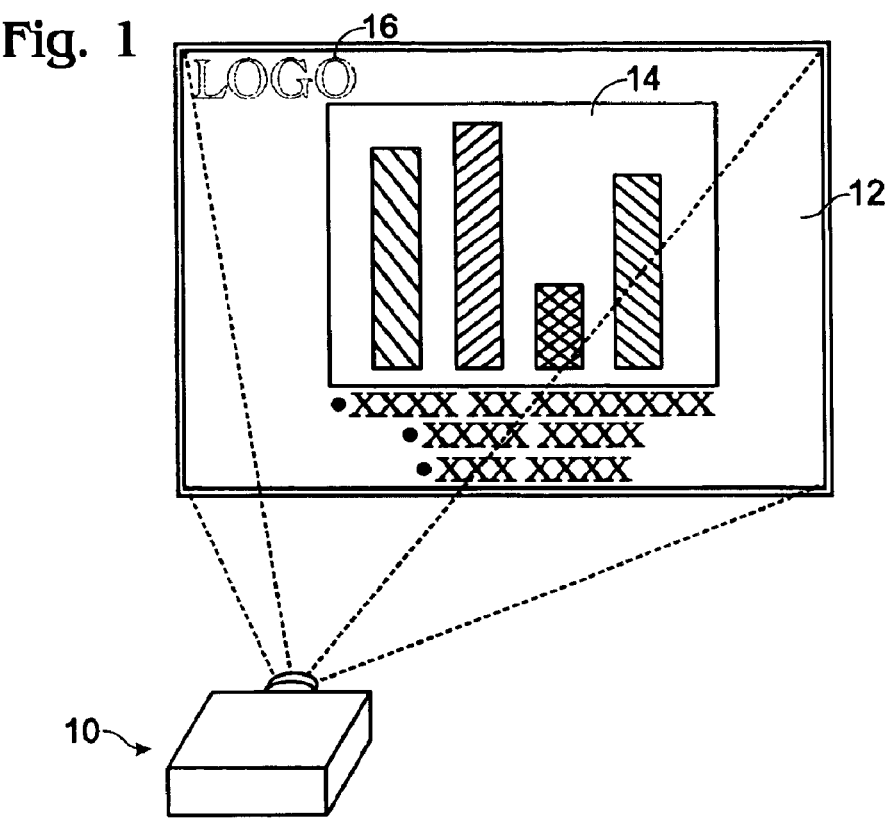
FIG. 1 is a schematic depiction of a projector system according to an embodiment of the present invention, projecting an exemplary identification image over a content image.

FIG. 1 shows, generally at 10, an exemplary embodiment of a projector system according to the present invention, projecting a display 12 onto a viewing surface. Display 12 includes a content image, indicated generally at 14, and an identification image, indicated generally at 16. Content image 14 is configured to convey presenter-selected content information to a viewing audience. Identification image 16 is configured to display information regarding the identity of projector system 10, as explained in more detail below.

Projector system 10 may take the form of any suitable type of projector system, and is typically a digital projector system. Examples include, but are not limited to, larger digital projector systems intended for use as permanent installations in meeting rooms, as well as smaller, portable digital projector systems. Likewise, projector system 10 may be configured to display any suitable type of content image 12. Examples include, but are not limited to, content in the form of presentation slide files provided by a computing device, as well as analog or digital video signals from sources such as cable and satellite video installations, DVD players, videocassette players, etc.

As mentioned above, identification image 16 is configured to display information regarding the identity of the projector over content image 14 (or any default images displayed in the absence of a content image, such as splash screens, etc.). Identification image 16 may be used to display any suitable type of identification information. For example, where projector system 10 is owned by a corporate entity, the identification image may take the form of a company logo, slogan, trademark, etc., as shown in FIG. 1.

The display of identification image 16 over content image 14 exposes an audience to the logo, slogan, trademark, etc. represented by the identification image for the duration of the presentation, regardless of the content information being presented. Prior methods of exposing an audience to such identification information have been more limited in their application. For example, prior methods of including identification information in a digital slide presentation have typically involved using special slide templates having backgrounds that include the desired logo, slogan or trademark to create each individual slide. Thus, where the content being presented was not prepared by or on behalf of the presenter, identification information may be entirely absent from display 12 during the presentation.

In contrast, projector system 10 allows a desired identification image selected by a user to be presented over any or all desired content images, regardless of the source of the image. Identification image 16 may also serve the additional purpose of helping to deter theft. This is because a viewer watching a presentation on a stolen projector system may recognize the logo, slogan, trademark, etc., and realize that the projector system may not be owned by the current user.

Identification image 16 may be displayed at any suitable location on display 12 relative to content image 14. In FIG. 1, identification image 16 is located adjacent a top left corner of display 12. In this location, identification image 16 does not detract from content image 14, but is still noticeable to viewers. Likewise, identification image 16 may have any suitable appearance and size relative to content image 14. In FIG. 1, identification image 16 is depicted as having a transparent, embossed appearance on display 12, and is sized to fit in the top left corner of the display. Thus, any portion of content image 14 that overlaps identification image 16 will still be visible to a viewer through the identification image.

Figure 2:
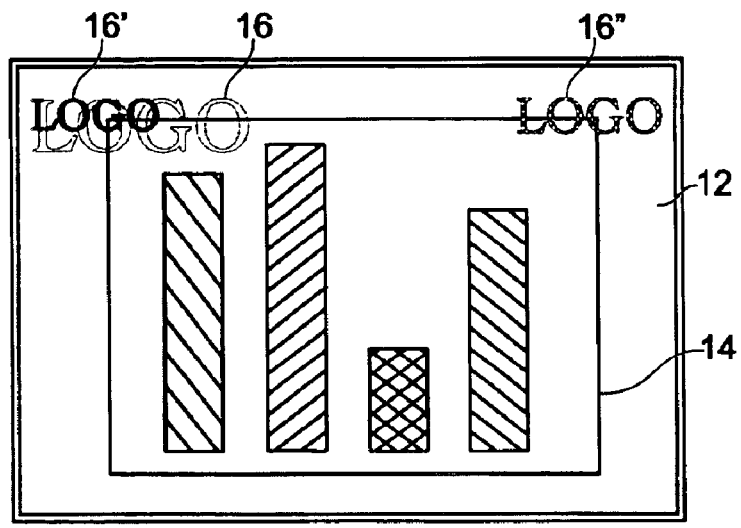
FIG. 2 is a view of the identification image of FIG. 1, showing examples of suitable locations, sizes and appearances for the identification image.

FIG. 2 shows some examples of other suitable sizes, locations and appearances for identification image 16. First, identification image 16 may have an opaque appearance, as shown at 16', or a semi-opaque appearance, as shown at 16", rather than a transparent and/or embossed appearance. Likewise, identification image 16 may be located in an upper left corner of display 12, as shown at 16 and 16', in an upper right corner, as shown at 16", in any other corner, along a top, bottom or side edge of the display, or even in a more central region on the display. Where identification image 16 is located in a more central location on display 12, it may be desirable for identification image 16 to have an at least partially transparent appearance to avoid interfering with the presentation of content image 14.

In some embodiments, various characteristics of the appearance of identification image 16 may be adjustable by a user. For example, a user may be able to turn the projection of identification image 16 on or off. Likewise, the user may be able to select or set the size, location, degree of transparency, color, location, color saturation, or any other suitable characteristic of the appearance of identification image 16. Furthermore, in some embodiments, access to some user-selectable characteristics may be restricted to users with a higher privilege level to the exclusion of users with a lower privilege level, as described in more detail below.

Identification image 16 may be generated and displayed in any suitable manner. For example, identification image 16 may either be incorporated into content image 14 before the content image is generated, or may be displayed on top of the content image. Displaying identification image 16 over content image 14 may be simpler to implement, as this may not entail altering the source file for the content image. Identification image 16 may be displayed over content image 14 by using similar techniques and/or software as those well known in the digital projector system arts to display user control menus over a content image.

Figure 3:
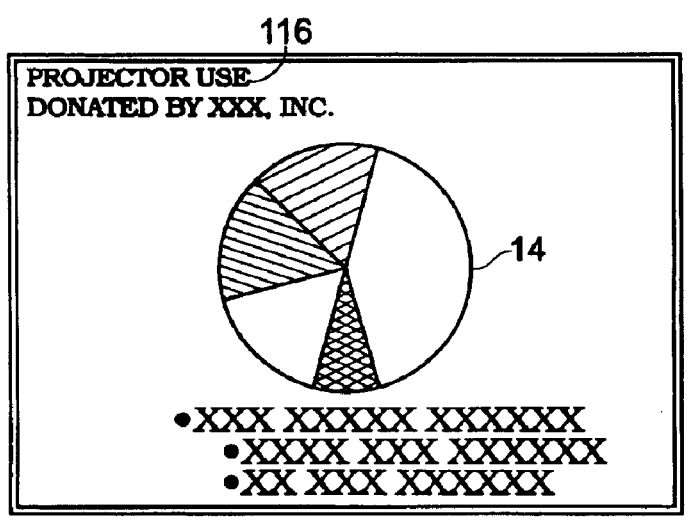
FIG. 3 is a view of another exemplary identification image projected over a content image.
Figure 4:
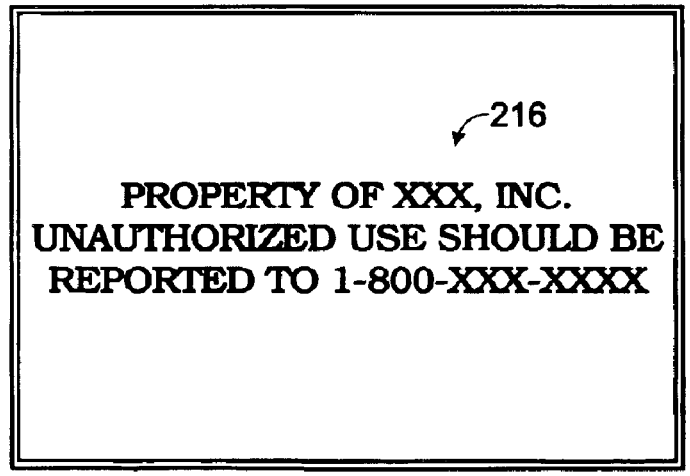
FIG. 4 is a view of another exemplary identification image projected over a content image.

FIGS. 3 and 4 show examples of other suitable identification images than a corporate logo, slogan, trademark, etc. First, FIG. 3 shows an identification image 116 in the form of a message identifying a company that has provided the use of projector system 10. Identification image 116 may be used where a presentation is given by an entity other than the owner of the projector system to build goodwill in the entity that donated the projector system use.

Prior methods of publicizing an entity that provides money or equipment for another entity's presentation typically involve acknowledging the donating company via an introductory or concluding screen. However, this exposes a viewing audience to the identification information for only a short time relative to the overall length of the presentation. In contrast, the use of identification image 116 exposes an audience to the identification image throughout the duration of a presentation, and thus may be more effective at building goodwill or brand recognition than showing the company name only at the beginning and/or end of a presentation.

Next, FIG. 4 shows another example of a suitable identification image, generally at 216. Identification image 216 includes a message setting forth the owner of projector system 10, and a telephone number that may be called to report unauthorized uses of the projector system. Thus, while identification image 216 identifies the owner of the projector system, it is intended to have a primary purpose of theft deterrence, rather than name or brand exposure. It may be desirable to use identification image 216 in projector systems that may be prone to thefts, such as those owned by schools, large businesses with high employee turnover, etc.

Identification image 216 may be configured to be projected continuously throughout an entire presentation, or may be configured to be presented only on an introductory screen, such as a splash screen. Where identification image 216 is displayed throughout a presentation, it may be positioned in a corner or along a side of display 12, rather than in the center of the display, to avoid interfering with the presentation.

Identification image 216 may also include a password prompt (not shown) requiring a user to input a password in order to use projection system 10 to present content. Such password may be input in any suitable manner. For example, where projector system 10 is controlled by an external computing device, the password may be input via the computing device. Alternatively, where projector system 10 includes its own input device, such as a keypad (not shown), the password may be entered via the user input device of the projector system.

Projector system 10 may be configured to have different privilege levels for different users such that only a restricted class of users has the ability to change identification image 16. For example, where projector system 10 is used in a multi-user environment, such as a business or school, it may be desirable to allow only users with a higher privilege level, such as a system administrator, to change the message, symbol, logo, etc. displayed as identification image 16, or to turn the display of the identification image on or off. Here, projector system 10 (or an external computer used to control the projector system) may include a username and/or password list or database (or single password) stored thereon, and may require a user to enter either a username and password, or just a password, to access controls related to identification image 16.

On the other hand, for some use environments, it may be desirable to allow any user with an ordinary use privilege level (i.e. sufficient privilege to use projector system 10 to present content) to customize the appearance and/or location of identification image 16 to best position the identification image for a selected presentation. In this situation, projector system 10 may be configured to require entry of a password only when a user attempts to load a new identification image into the projector system.

Likewise, as described above for identification image 216, there may be use environments in which it is desirable to require a user to enter a password before displaying content with projector system 10. In this situation, projector system 10 (or an external computer used to control the projector system) may include a user information list or database that stores a list of authorized users, along with a privilege level associated with each user. Here, projector system 10 may determine the privilege level associated with each user who uses the projector system, and may grant access to various controls of identification image 16 accordingly.

Figure 5:
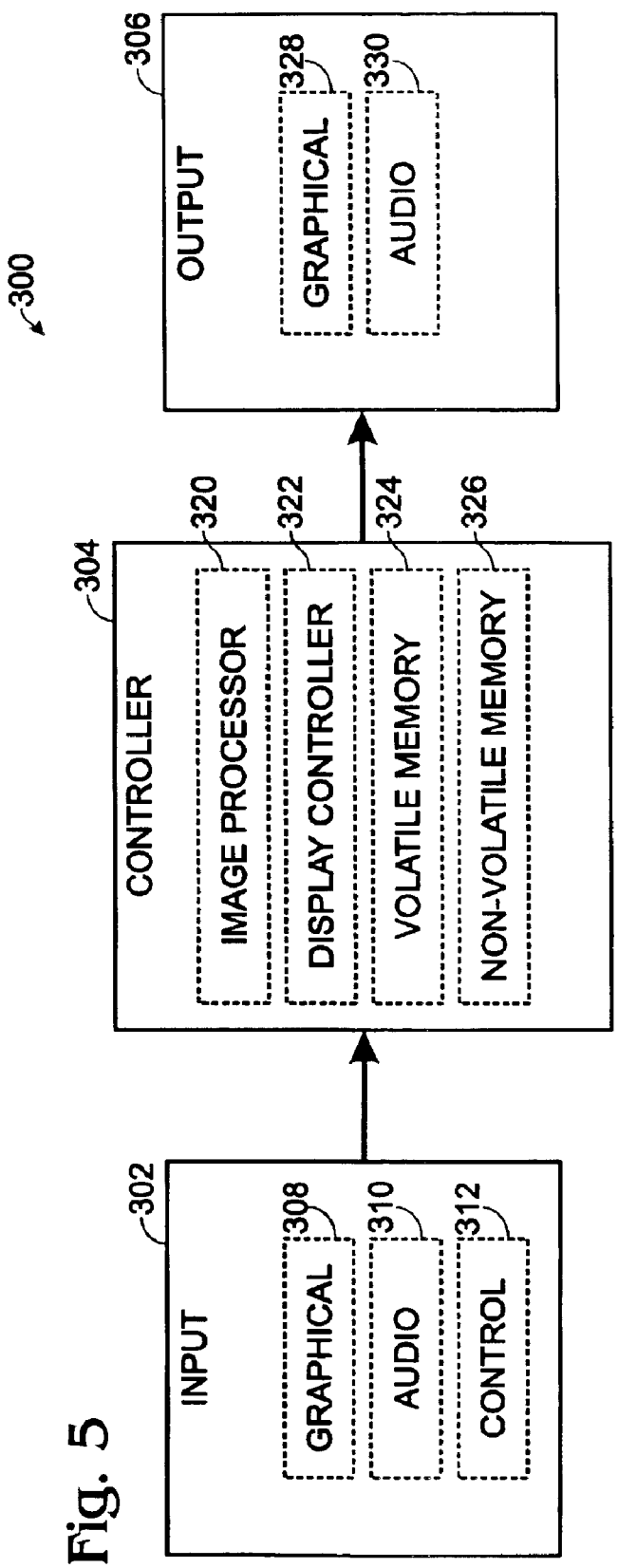
FIG. 5 is a block diagram of a projector system according to an embodiment of the present invention.

FIG. 5 shows, generally at 300, a greatly simplified block diagram of a suitable electrical system architecture for projector system 10. Electrical system 300 includes an input 302 for accepting inputs of content and control signals, a controller 304 related to processing of the input signals, and an output 306 for output of a presentation in audio and/or visual format.

Input 302 typically includes one or more graphical inputs 308 configured to accept the input of graphical data from one or more types of sources. Examples of suitable graphical inputs include, but are not limited to, SVGA, CVBS, SVHS and CPNT, computing device inputs such as M1-A, M1-D, USB, and IEEE 1394 ports, wireless inputs such as a BLUETOOTH receiver, and network inputs such as an ETHERNET port and/or an RS-232 port. Input 302 also may include an audio input 310 for accepting the input of audio signals.

Input 302 also typically includes a control input 312 configured to accept input of commands for controlling projector system 10. Examples of typical projector system functions that may be controlled via input to control input 312 include, but are not limited to, power off/on, lamp off/on, fan off/on, and ceiling/table mount settings. Control input 312 may be configured to accept input from any suitable input device. For example, control input 312 may include one or more infrared receivers configured to receive a control signal from an infrared remote control. Control input 312 may also include an on-board input device, such as a keypad (not shown) included on projector system 10.

Control input 312 may also be configured to accept input of control commands related to identification image 16 (or 116 or 216). For example, control input 312 may be configured to accept input of identification information in the form of a graphics file or text file representing the appearance of identification image 16. Furthermore, control input 312 may be configured to accept user identification and/or password information to allow a user to modify the appearance of identification image 16. Alternatively, the user identification and/or password information may be stored and processed on an external computing device (not shown) used to control projector system 10, as described above.

It will be appreciated that video input 308, audio input 310 and control input 312 may include any suitable circuitry for decoding, demodulating, or otherwise processing input signals into the correct format for downstream components.

Next, controller 308 may include such components as an image processor 320 and a display controller 322. Image processor 320 is configured to process input received at video input 308, and to output a corresponding video output signal to display controller 322. Display controller 322 is configured to drive a digital micromirror device (DMD), liquid crystal display (LCD), liquid crystal on silicon (LCOS) display, or other suitable display device (which is typically part of a graphical output 338) to produce display 12 (in combination with a lamp and other suitable optics). Controller 308 may also include an audio processor (not shown) to generate a suitable audio signal that may be converted into sound by a suitable transducer (which is typically part of an audio output 330).

Image processor 320 and display controller 322 may be configured to accept input from control input 312 for controlling the operation of the image processor and display controller. Furthermore, image processor 322 may be configured to generate menus (or other user interfaces) on display 12 over portions of content image 14 when a user selects to change a projector system setting, as is known to one skilled in the relevant art.

Next, controller 308 also includes both volatile memory 324 and non-volatile memory 326. Volatile memory 324 is typically employed in the storage and processing of video and/or audio signals from input 302. Non-volatile memory, on the other hand, is configured to store data configured to be preserved unless changed by a user. For example, non-volatile memory 326 may be configured to store the identification information that represents identification image 16. Non-volatile memory 326 may also be configured to store user identification and/or password information where appropriate. Furthermore, non-volatile memory 326 also may be configured to store information representing the appearance and functionality of user-interface menu trees, etc. that may be displayed over content image 14 when prompted by a user.

Controller 322 is configured to control the appearance and display of identification image 16. As described above, controller 322 may accomplish this in any suitable manner. For example, controller 322 may generate identification image 16 in the same manner used to generate a graphical user interface menu that is displayed over content image 14, or may alter selected pixels to incorporate identification image 16 into content image 14.

Controller 322 may also be configured to allow a user (with a sufficient privilege level) to modify the appearance of identification image 16 in a suitable manner. Examples of suitable appearance characteristics of identification image 16 that may be modified include, but are not limited to, color, color saturation, size, location and degree of transparency.

Where non-volatile memory 326 is configured to store user identification and/or password information, controller 322 may also be configured to compare a user-entered username and password to a list or database of usernames and associated passwords stored within non-volatile memory 326 before allowing the user to use projector system 10 for the presentation of content information. Likewise, controller 322 may be configured to verify a user's privilege level before allowing a user to load a new identification image 16 into non-volatile memory 326, or to change an appearance characteristic of the identification image.

Figure 6:
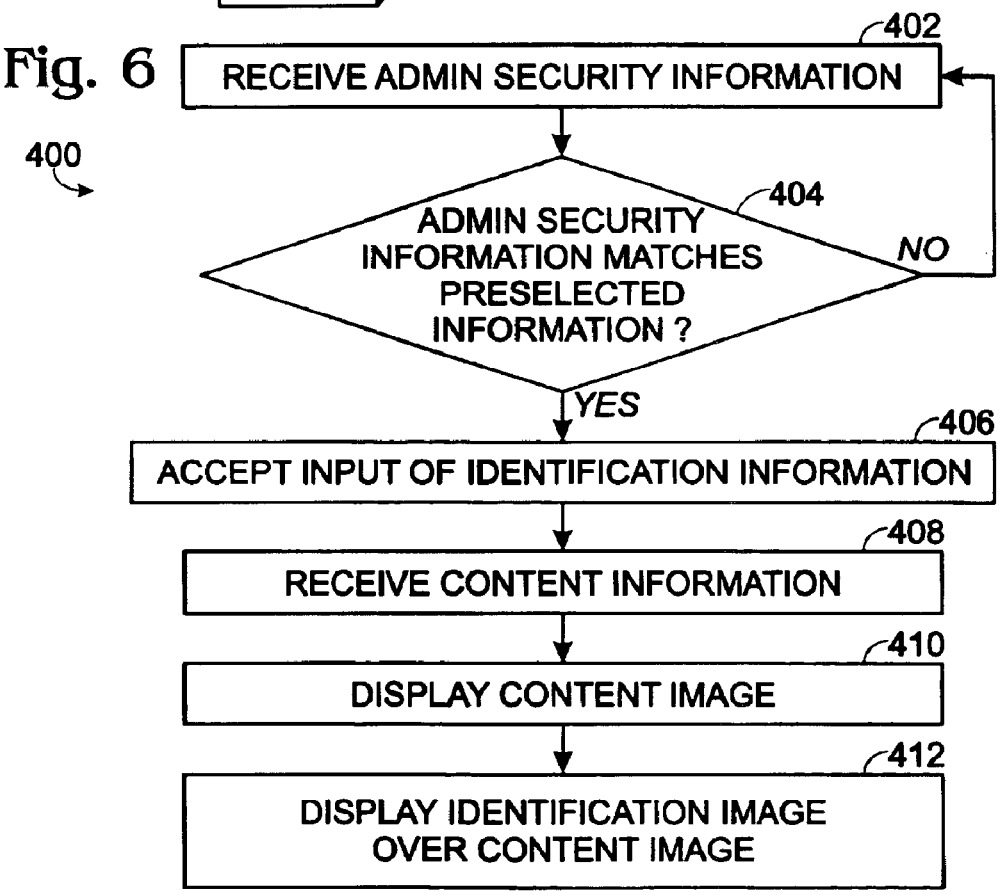
FIG. 6 is a flow diagram of a method of displaying identification information according to an embodiment of the present invention.

FIG. 6 shows a first exemplary manner of implementing the display of identification image 16, generally at 400. Method 400 first includes loading identification information representing identification image 16 into non-volatile memory 326. As described above, it may be desirable to limit the number of users who have the ability to load a new identification image into non-volatile memory 326 to those users with a higher, administrative security level. Thus, projector system 10 (or an external computing device used to control the projector system) first receives an input of administrative security information at 402. The administrative security information may include both a username and a password, or just a password.

Next at 404, projector system 10 (or external computing device) compares the received administrative security information to preselected user identification and/or password information stored in non-volatile memory 326 to determine whether the input administrative security information matches the stored user identification and/or password information. If the received administrative security information does not match the preselected information, then the user is denied permission to load a new identification image into non-volatile memory 326, and projector system 10 waits to receive new administrative security information. However, if the received administrative security information matches the preselected information, then projector system 10 accepts the input of new identification information at 406.

After the identification information has been loaded into non-volatile memory 326, the projector is ready to present content information as content image 14. First, projector system 10 receives an input of content information at 408. Next, the content information is processed and displayed on display 12 as content image 14. At the same time, the identification information entered at 406 is displayed over content image 14 as identification image 408. It will be appreciated that identification image 16 may also be displayed over any other image besides content image 14, including, but not limited to, a splash screen displayed upon powering up projector system 10, and a default screen displayed in the absence of any content image.

Figure 7:
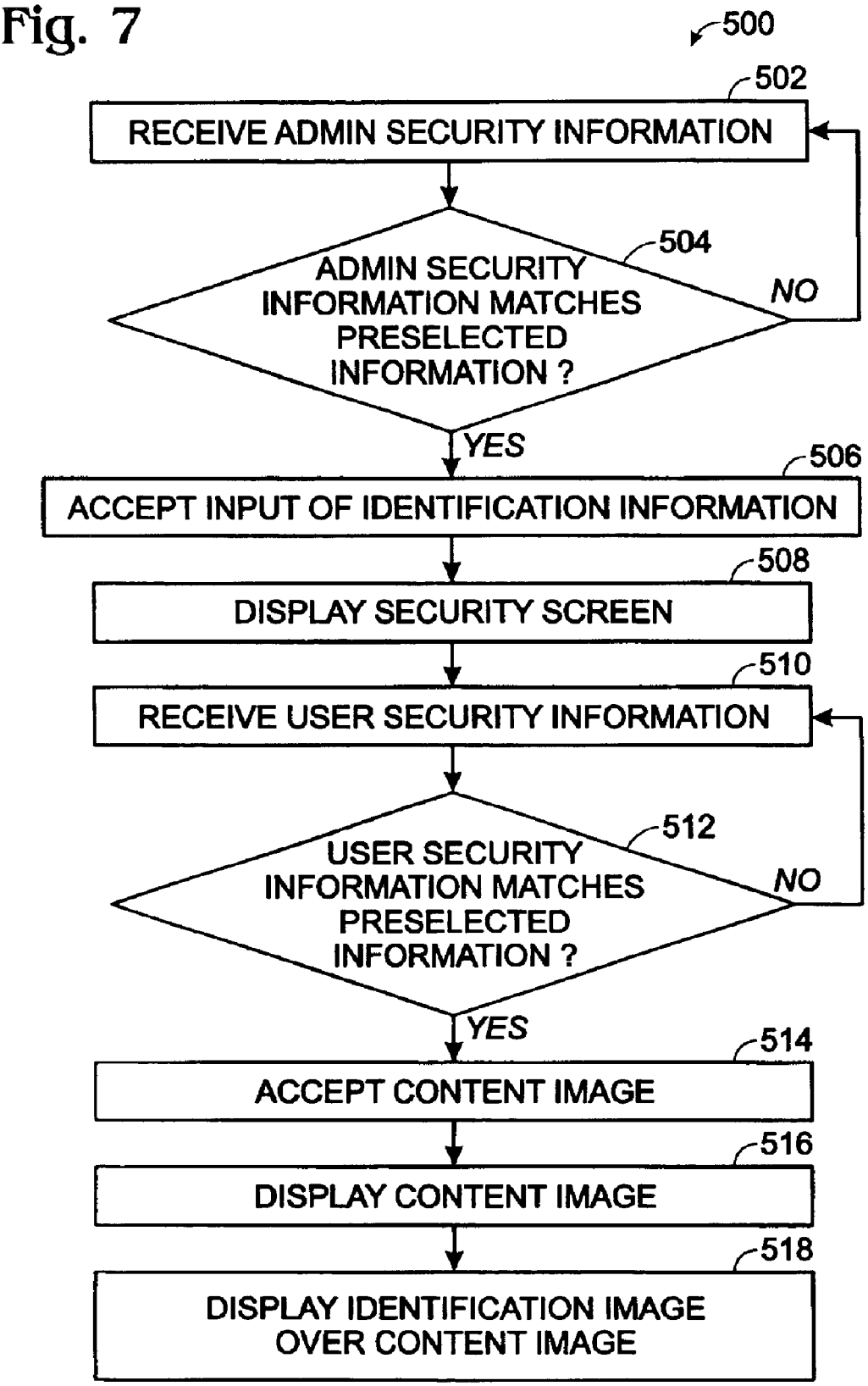
FIG. 7 is a flow diagram of a method of displaying identification information according to another embodiment of the present invention.

FIG. 7 shows another method of displaying identification image 16, generally at 500. Method 500 requires a user to enter security information before presenting content with projector system 10, and thus may be suitable for use with an identification image similar to identification image 216 of FIG. 4.

Method 500 includes first receiving administrative security information at 502. Next at 504, projector system 10 (or external computing device) compares the received administrative security information to preselected user identification and/or password information stored in non-volatile memory 326 to determine whether the input administrative security information matches the stored user identification and/or password information. If the received administrative security information does not match the preselected information, then the user is denied permission to load a new identification image into non-volatile memory 326, and projector system 10 waits to receive new administrative security information. However, if the received administrative security information matches the preselected information, then projector system 10 accepts the input of new identification information at 506, and displays the identification information as a security screen (similar to identification image 216) at 508.

At this point, projector system 10 is ready to present content. However, in the embodiment of FIG. 7, projector system 10 may not be used to present content until a user enters acceptable user security information in the form of a valid username and/or password. Thus, projector system 10 next receives user security information at 510, and verifies that the received user security information matches preselected security information stored within projector system 10 (or an external computing device), typically in the form of a list or database of authorized users. If the received security information does not match any authorized usernames and/or passwords, then projector system 10 denies access and continues to wait to receive user security information.

On the other hand, if the security information received at 510 matches the preselected security information at 512, then the projector device accepts the input of content information at 514 and displays a content image representing the content information at 516. Furthermore, projector device 10 may also display an identification image over the content image at 518 if desired.

It will be appreciated that the identification images shown in FIGS. 1–4 are merely exemplary, and that any other suitable identification image that conveys any suitable identification information may also be used.

Furthermore, although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projector device configured to present identification information, the projector device comprising:
   a display device; and
   a controller configured to control the display device;
   wherein the display device is configured to project a display onto a viewing surface; and the controller is configured to generate an identification image that may be projected onto the viewing surface by the display device over at least a part of the display; and wherein the identification image is configured to convey the identification information to a viewer of the display.

2. The projector device of claim 1 wherein the identification information comprises information regarding an identity of an owner of the projector device.

3. The projector device of claim 1 wherein the display includes a content image and wherein the identification image is projected over the content image.

4. The projector device of claim 1 wherein the display device is configured to project a default image when no content is provided to the projector device, and wherein the identification image is projected over the default image.

5. The projector device of claim 4 wherein the default image is an introductory image displayed upon start-up of the projector device, and wherein the identification image is projected over the introductory image.

6. The projector device of claim 4 wherein the identification image includes a warning message.

7. The projector device of claim 6 wherein the identification image includes a password prompt.

8. The projector device of claim 6 wherein the projector device further comprises an input component configured to accept user-entered security information and a memory configured to store preselected security information, wherein the controller is configured to allow the projector device to be used to present content if the user-entered security information matches the preselected security information.

9. The projector device of claim 1 wherein the display device is configured to display a default image and a content image on the viewing surface and wherein the identification image is selectively displayable over one or more of the default image and the content image.

10. The projector device of claim 1 wherein one or more of the location, the size, and the color saturation of the identification image is adjustable by a user of the projector device.

11. The projector device of claim 1 wherein the identification image is at least partially transparent.

12. The projector device of claim 11 wherein the transparency of the identification image is adjustable by a user of the projector device.

13. The projector device of claim 1 wherein the identification information is changeable by a user of the projector device.

14. The projector device of claim 13 wherein the identification information is changeable by a user of the projector device with a higher privilege level to the exclusion of a user with a lower privilege level.

15. The projector device of claim 1, wherein the identification information includes one or more of a company logo, a slogan, and a trademark.

16. A projector device configured to present identification information, the projector device comprising:
- an input component for accepting inputs of content and control signals;
- a controller responsive to the input and configured to control one or more appearance characteristics of an identification image; and
- an output component configured to project a display onto a viewing surface and to project the identification image over at least a part of the display;
- wherein the identification image is configured to convey the identification information to a viewer of the display.

17. The projector device of claim 16 wherein the input component includes one or more of a graphical input configured to accept input of graphical data, an audio input configured to accept input of audio signals, and a control input configured to accept input of commands related to one or more of controlling the projector device and controlling the identification image.

18. The projector device of claim 16 wherein the controller includes an image processor configured to process graphical input and to output a corresponding video output signal.

19. The projector device of claim 16 wherein the image processor is further configured to generate one or more user menus for projection over at least a part of the display.

20. The projector device of claim 16 wherein the controller includes a display controller configured to drive the output component to produce a display.

21. The projector device of claim 16 wherein the controller includes a memory configured to store the identification image.

22. The projector device of claim 16 wherein the output component includes a display device.

23. The projector device of claim 22 wherein the display device includes one or more of a digital micromirror device, a liquid crystal display, and a liquid crystal on silicon display.

24. The projector device of claim 16 wherein the input component is configured to accept user-entered security information, and wherein the controller is configured to compare user-entered security information to preselected security information.

25. The projector device of claim 24 wherein the controller is further configured to allow a user to modify an appearance characteristic of the identification image if the user-entered security information matches the preselected security information.

26. A projector device configured to prevent unauthorized use of the projector device, comprising:
- a first memory location for storing information representing a security image displayable on the display;
- a second memory location for storing preselected security information;
- means for projecting a display onto a viewing surface;
- means for projecting the security image onto the viewing surface over at least a part of the display;
- means for receiving a user-provided input of security information;
- means for comparing the user-provided input of security information with the preselected security information; and
- means for allowing the projector device to display a presentation when the user-provided input of security information matches the preselected security information.

27. The projector device of claim 26 wherein the security image is displayed upon the occurrence of one or more of powering up the projector device, exiting a sleep mode, and expiration of a predetermined time period of inactivity.

28. The projector device of claim 26 wherein the information representing a security image is changeable by a user of the projector device with a higher privilege level to the exclusion of a user with a lower privilege level.

29. A projector device configured to present identification information, the projector device comprising:
- means for projecting a display onto a viewing surface; and
- means for projecting an identification image onto the viewing surface over at least a part of the display, wherein the identification image is configured to convey the identification information to a viewer of the display.

* * * * *